United States Patent [19]

Ghose et al.

[11] 3,716,863
[45] Feb. 13, 1973

[54] INSTRUMENT LANDING ERROR CORRECTING SYSTEM

[75] Inventors: Rabindra N. Ghose, Los Angeles; Walter A. Sauter, Malibu, both of Calif.

[73] Assignee: American Nucleonics Corp., Woodland Hills, Calif.

[22] Filed: Aug. 6, 1970

[21] Appl. No.: 61,566

[52] U.S. Cl. ............ 343/108 R, 325/65, 343/100 R, 343/109
[51] Int. Cl. .................................................. G01s 1/16
[58] Field of Search ........ 343/109, 108, 100 CS, 100; 325/65

[56] References Cited

UNITED STATES PATENTS

| | | | |
|---|---|---|---|
| 2,287,550 | 6/1942 | Carter | 325/65 |
| 2,406,734 | 9/1946 | Alford | 343/108 R |
| 3,176,231 | 3/1965 | Vallese et al. | 343/109 X |
| 3,537,008 | 10/1970 | Lakatos | 325/65 |

Primary Examiner—Benjamin A. Borchelt
Assistant Examiner—Richard E. Berger
Attorney—John E. Wagner

[57] ABSTRACT

A system is disclosed for automatically reducing antenna radiation pattern errors of the localizer beams of instrument landing systems (ILS) commonly used in the United States of America and elsewhere to assist in landing of aircraft. The system is designed to produce a signal which cancels the error resulting from reflections from physical objects illuminated by the localizer antenna which otherwise would displace the ILS localizer null line of position. The system employs a correction signal generator that is synchronized with the carrier frequency generator of the ILS. Its radiating antenna is collocated with the localizer antennas or in the direct line between the runway localizer antennas and the reflecting physical object. The correction signal generator provides a signal with a modulation that is equal in amplitude and opposite in polarity and phase coherent with that of the dominant signal illuminating the reflecting physical object. The ILS receiver and the landing aircraft in the antenna field automatically adds the reflected dominant ILS and the correction signal algebraically resulting in the elimination of the error.

11 Claims, 6 Drawing Figures

PATENTED FEB13 1973 3,716,863

INSTRUMENT LANDING ERROR CORRECTING SYSTEM

BACKGROUND OF THE INVENTION

The Instrument Landing System (ILS) has been used for at least 25 years as a landing aid for aircraft in the United States. It employs basically three simultaneous radio radiations with established frequencies and modulations, as well as antenna patterns. They include a runway localizer transmitter which produces a pair of fan-shaped main lobes along the centerline of the airport runway with a carrier of approximately 110 ± 2 mHz modulated to one side of the runway axis with 150 Hz signal and the other lobe on the opposite side modulated at 90 Hz. The runway localizer provides proper heading for the aircraft to the runway. Three vertically radiating antennas or marker beacons are on the axis of the runway at established distances from the end of the runway. These beacons operate at 75 mHz and have a vertical fan-shaped beam and provide an indication of distance to touchdown for the pilot. The third radiating system or the glide path localizer provides vertical reference information having a carrier of 328.6–335.4 mHz with two antenna lobes similar to the runway localizer, only in the vertical plane with the upper lobe above the pre-determined glide path modulated at 90 cycles and the lower lobe modulated at 150 cycles.

The foregoing system is subject to the normal predictability in radiation pattern encountered in electromagnetic radiation in the frequency ranges and antenna systems selected. However, one problem which has adversely effected the reliability of such systems is the presence of some interfering or reflecting structure in the antenna field which disturbs the radiation pattern to the extent that pilots relying on the system can receive incorrect indication on their aircraft borne receivers. One particularly troublesome factor is that the system can be installed and antennas properly aligned and radiation pattern established, but the addition of hangers or other structures along a runway or in the pattern in general, distorts the localizer and glide path patterns. In the past, this has been partially resolved by subsequent antenna pattern adjustments or by simply accepting the resultant distortion or bend.

We have devised an active, totally automatic system for producing a signal which is radiated along the ILS localizer to structure propagation path with a modulation polarity and amplitude such that any error signal received from the offending reflected structure will not appear at the output of the intended receiver.

One approach to minimize the distortion from structures in the vicinity of ILS radiation beams is to synthesize and radiate a correcting signal which will be equal in amplitude and spectral characteristics but opposite in phase to the building-reflected signal at the intended receiver antenna at all times. The problem of synthesizing such a correcting signal for an almost arbitrary building-reflected signal, however, is very involved. Also, closed-loop and continuous monitoring operations would be necessary so that the correcting signal can be adjusted as frequently as necessary.

The greatest difficulty in implementing this approach is to properly locate and adjust the radiating antenna system for the correcting signal. This is because the correcting and the building-reflected signals must be phase congruent to effect a correction over any desired region. The phase congruence, on the other hand, requires the location of the correcting antenna at the equivalent phase center of the building-reflected signal. Since for an arbitrary building-like reflector, this phase center for the reflected signal may even be inside the structure itself, the implementation of this approach may not often be possible even theoretically.

An alternate approach would be to reduce or correct the 90 or 150 Hz modulation output of the ILS receiver, instead of its total RF input, for that part of the ILS signal which results from building reflecting. Since for such a case no attempt is required to correct the RF signal input to the ILS receiving antenna, the problem of carrier phase congruence is entirely avoided. We have achieved such an approach.

Since in the ILS the position of the aircraft is determined from post-detection intelligence of the ILS receiver, and since this intelligence is independent of the RF phase of the ILS carrier signal, it is possible to design a system where phase congruence of the ILS reflection and its correcting signal is unnecessary. The Instrument Landing Error Correcting System (ILECS) designed by us eliminates ILS error by radiating a correcting signal which, when detected by the ILS receiver, nulls the dominant modulation error resulting from the building-reflected signal.

BRIEF STATEMENT OF THE INVENTION

In accordance with our invention, a directional antenna system is used to radiate a signal which has a definite spectral relationship to the building-reflected signal. As mentioned earlier, the objective of the system is not primarily to correct the RF building-reflected field but to provide an auxiliary input to the ILS receiver so that the correcting and the building-reflected signals yield no guidance error after detection by the receiver anywhere within the normal range of the operating system. To meet this objective, control of the phase and amplitude of one of the modulating signals is chosen to enable the system to operate anywhere within the range of the VHF transmitters without introducing significant phase summing errors. For example, since the wavelength of the 150 Hz modulation frequency is 2,000 kilometers, the effect of aircraft motion or position upon the residual that remains after two 150 Hz modulation signals with a phase difference of 180° are summed is negligible. In the practical case, this means that the major criteria for effective reduction of a reflection is control of the amplitude and radiation pattern of the cancellation signal.

The cancellation signal is synchronous with the carrier and dominant modulation of the reflected ILS signal but the modulation polarity will be reversed. Therefore, the sum of these two signals at the output of the rf detector is the algebraic sum of the ILS and cancellation modulation signals. Since the polarity of the modulation of the cancellation signal is the reverse of that of the ILS signal, the power level of one will be at a minimum while the power level of the other is at a maximum and vice versa. The detected sum of these two signals will yield only a DC output voltage when the cancellation signal is exactly equal to the interference signal and 180° out of phase. This resultant DC voltage is ultimately blocked by the 90 and 150 Hz filters in the ILS receiver so that it does not affect the reading of the ILS indicator.

The concept that the signal reflected by a structure can be cancelled by a radiated signal which is equal in amplitude but opposite in phase to that of the reflected signal when detected is basically sound. The degree of cancellation of a specific reflected signal lobe at any point then becomes a function of how well the radiation pattern of the ILECS antenna matches the ILS pattern that is illuminating the offending structure.

The preferred approach for the system that accomodates arbitrary radiation patterns from irregular reflecting structures is to place the cancellation antennas at the effective ILS beam source or on the line of sight between the offending structure and the ILS antennas. When the cancelling antenna is near the ILS antenna and both are a reasonable distance away from the offending structure, the ILECS radiation pattern can be matched to that of the original ILS illuminating signal. In the matched case, each reflected signal lobe will contain equal levels of ILS error and cancellation signal.

The normal extension of this approach for other reflecting structures is to place additional system antennas on the lines of sight between those structures and the ILS antennas. The total number of cancellation systems required will be dependent upon the amount of reduction required and the similarity between the system antenna radiation pattern and the ILS radiation pattern in that limited volume that includes the offending structure or structures.

DETAILED DESCRIPTION OF THE DRAWINGS

The foregoing description of this invention may be more clearly understood from the following detailed description and by reference to the drawings in which.

DETAILED DESCRIPTION OF THE INVENTION

Figure 1:
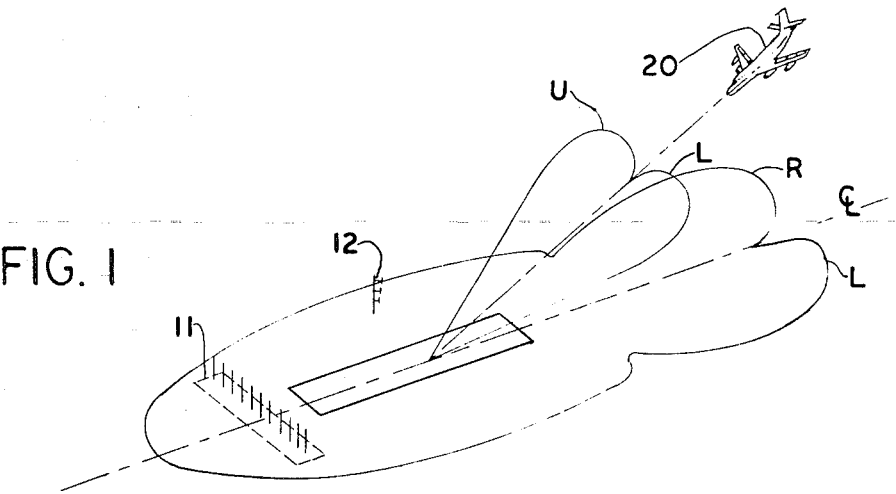
FIG. 1 is a perspective view of an airfield employing a typical ILS system with an aircraft approaching.

Now refer to FIG. 1 in which a typical runway of an airfield employing an instrument landing system may be seen. Two ILS antenna systems appear in FIG. 1, including the runway localizer 11 producing two main lobe transmissions L & R, one on each side of the centerline CL of the runway 10.

FIG. 1 also shows the glide path localizer upper and lower modulation lobes identified as U & L produced by glide path antenna 12 and shows a typical ideal heart-shaped pattern of the left and right signals of the runway localizer. Additionally, the three marker beacons unshown in the drawing identified as the inner beacon, the middle beacon, and the outer beacon, radiate in a generally vertical transverse plane to indicate the distances to the near end of runway 10.

Figure 2:
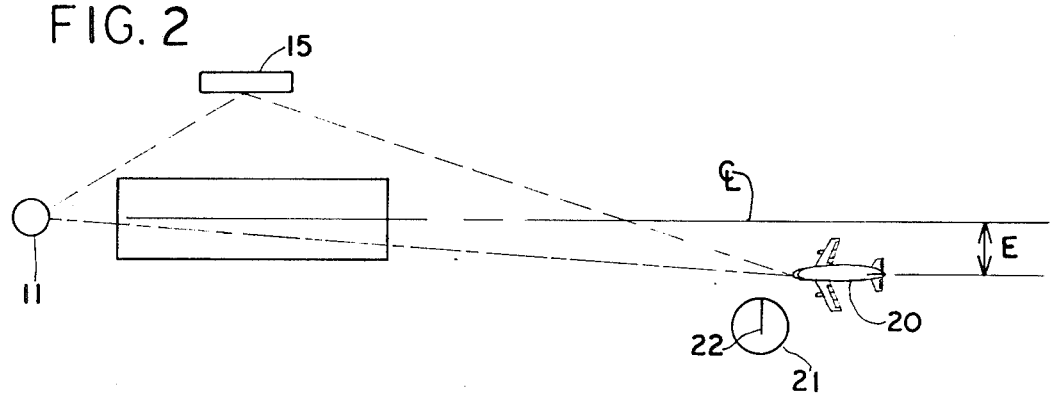
FIG. 2 is a top view of an ILS installation with the signal distorting building or structure in the field of the runway localizer antennae and an aircraft in the antenna field.

Now refer to FIG. 2 where the same arrangement is shown enlarged with the addition of an interfering structure 15 which may be a building or hanger positioned in the field of the right-hand beam. Also in the field is an aircraft 20 operating on a course parallel to the centerline of runway 10 but offset by an error E. The radiation from the runway localizer is represented in this case by dash-dot lines for the left beam and a dash line for the right beam. Normally, the ILS receiver of aircraft 20 would be dominated by the left-hand beam but due to presence of the interfering structure reflecting a strong coherent signal, the aircraft ILS receiver may receive enough additional right-hand beam signal to give a representation of being on the centerline of the runway. Although somewhat exaggerated, the arrangement of FIG. 2 describes a situation where the ILS receiver meter 21 of the aircraft receiver indicates the aircraft is in line with the runway as noted by the center position of the needle 22. The meter reading is of course incorrect by error E.

Figure 3:
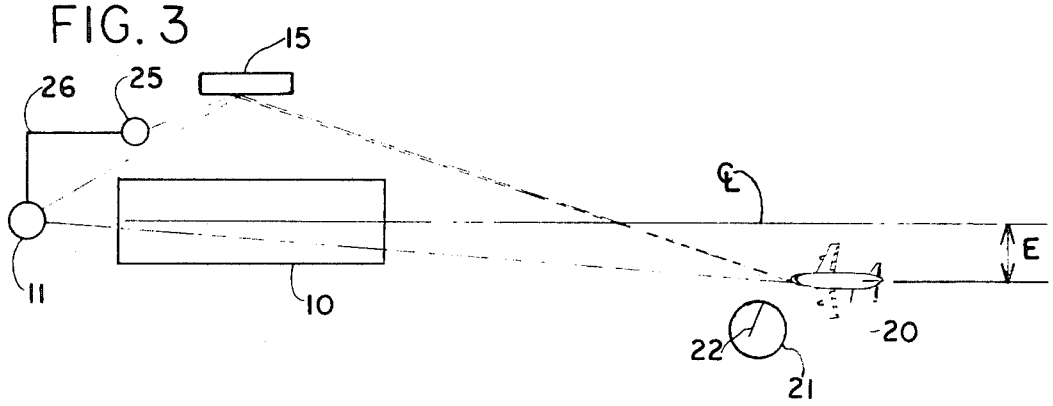
FIG. 3 is a top view of the arrangement of FIG. 2 with the correction system of this invention added.

The same set of conditions are represented in FIG. 3 with the offending structure 15 in the field and the aircraft 20 again offset by an amount E from the centerline of runway 10. In FIG. 2, an auxiliary transmitter 25 of this invention coupled by line 26 to the runway localizer 11 shown with antenna directed toward the offending structure 15 and positioned on the line between the localizer antenna 11 and offending structure 15. For convenience, the transmitter 25 is shown in approximately half the distance to the offending structure 15, although this position is not mandatory.

As shown in FIG. 3, the same radiation conditions of the primary left and right signals are received by the ILS receiver of aircraft 20, the left signal indicated by dash-dot line and the right signal by dash lines. The transmitter 25 transmits on a narrow beam at the offending structure 15 a signal of the same modulation and of the same carrier as the right signal modulation but opposite in phase. Since the signal is transmitted along approximately the same line as the primary signal from transmitter 11, the reflective characteristics of the offending structure 15 as applied to the primary signal will also be operative on the correction signal from transmitter 25. As a result, the aircraft 20 receives two opposite phase signals from the offending structure which, owing to the nature of the ILS receivers, tend to cancel each other such that the predominant signal at the ILS receiver output is the derivative of the left hand beam of the transmitter 11. This is represented on the runway localizer indicator meter 20 as a left error requiring a right turn correction as shown in FIG. 3 by the position of needle 22.

Figure 4:
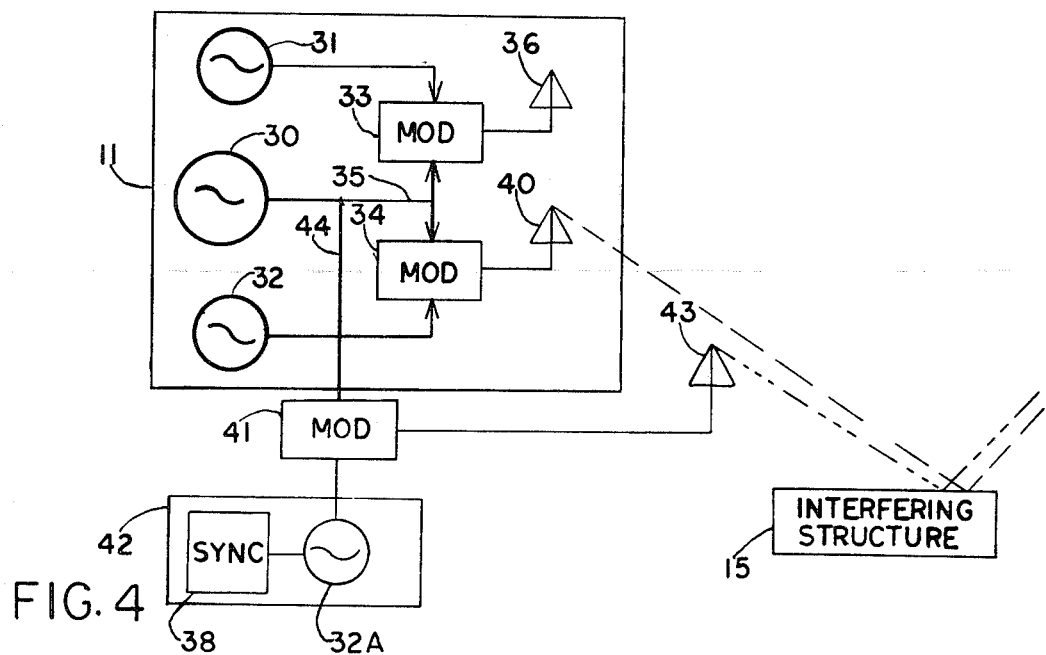
FIG. 4 is a simplified block diagram of this invention.

Now referring to FIG. 4 where the details of the ILS runway localizer system with the addition of this invention may be seen. The ILS transmitter 11 of FIGS. 1–3 appears more specifically as including a carrier signal generator 30 operating at approximately 110 mHz and a pair of oscillators 31 and 32 operating at 150 and 90 Hz, respectively. Both oscillators 31 and 32 are fed to respective modulators 33 and 34 to which the common carrier signal at 110 mHz is fed through lead 35. The carrier frequencies plus the 150 cycle modulation of the output of modulator 34 is fed to antenna 40 which radiates the carrier plus the 150 cycle modulation.

This invention involves the addition to the foregoing system of an additional modulator 41 and the correction system identified generally as box 42 as well as an additional correction antenna 43. The correction system includes a modulation oscillator 32a and a synchronizing circuit 38 for locking oscillator 32a at 180° out of phase with oscillator 32. The modulator 41 is preferably connected by leads 35 and 44 to the carrier oscillator 30 to receive the carrier of the same phase and frequency as the two primary principal radiating systems. The modulator 41 is supplied by the system 42 with a modulating signal equal in frequency and opposite in phase to the appropriate primary modulation frequency. For example, 150 Hz if the interfering structure to be compensated is on the 150 cycle modulation side of the runway centerline.

Figure 6:
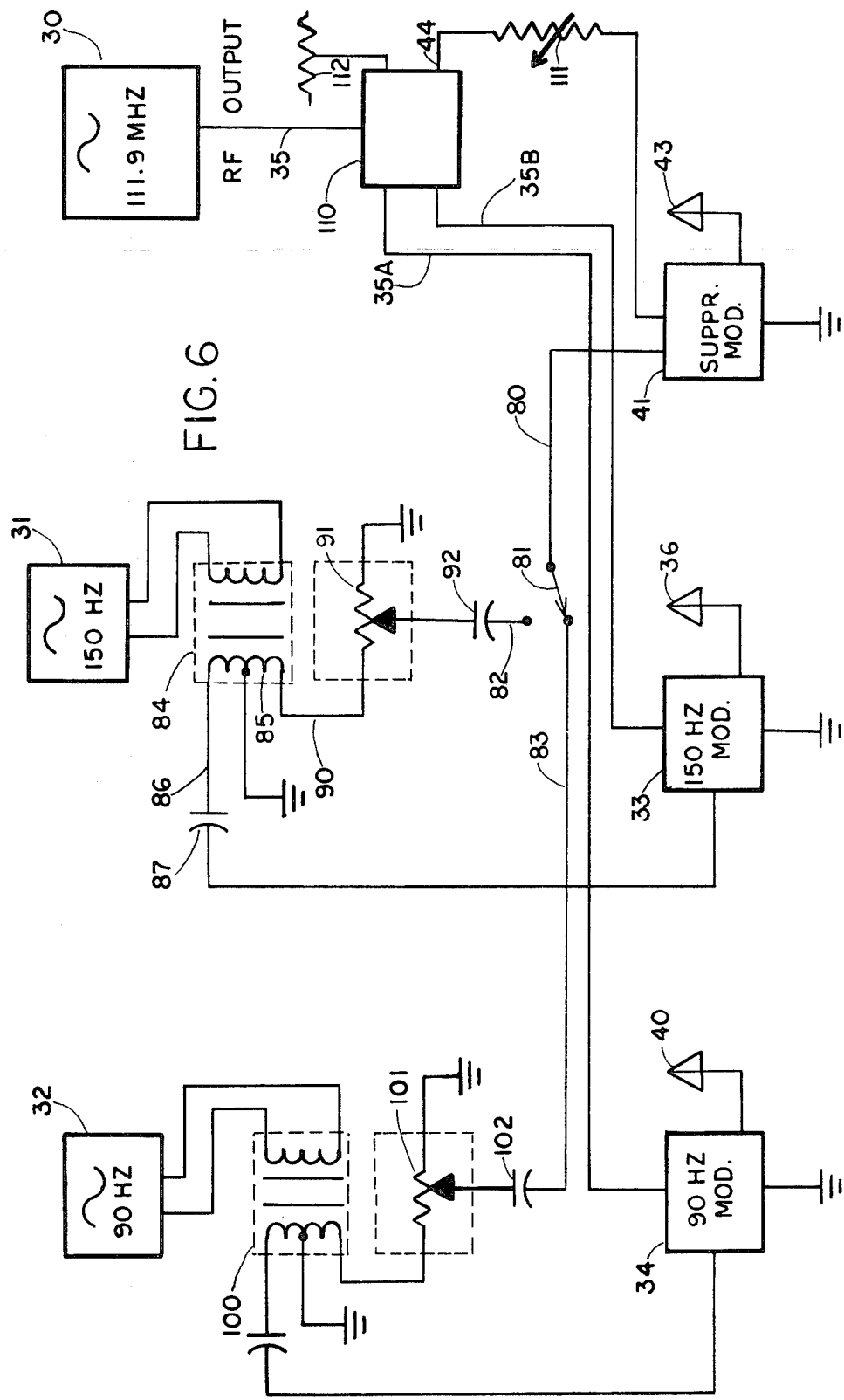
FIG. 6 is a more detailed block diagram of the system of FIG. 4.

The compensating system 42 comprises basically the oscillator 32a and synchronizing circuit 38 or as shown in FIG. 6 may be actually connected through a phase inverter to the appropriate modulation oscillator 31 and 32. The position of the correction antenna on the line of sight between the antenna 40 and interfering structure 15 is apparent in FIG. 4. The antenna 43 is designed to produce a narrow beam illuminate the to illuminate the structure to approximately the same extent as the principal antenna 40, therefore, the reflected signal from the two sources bear a high degree of spacial, frequency and phase relation.

Figure 5:
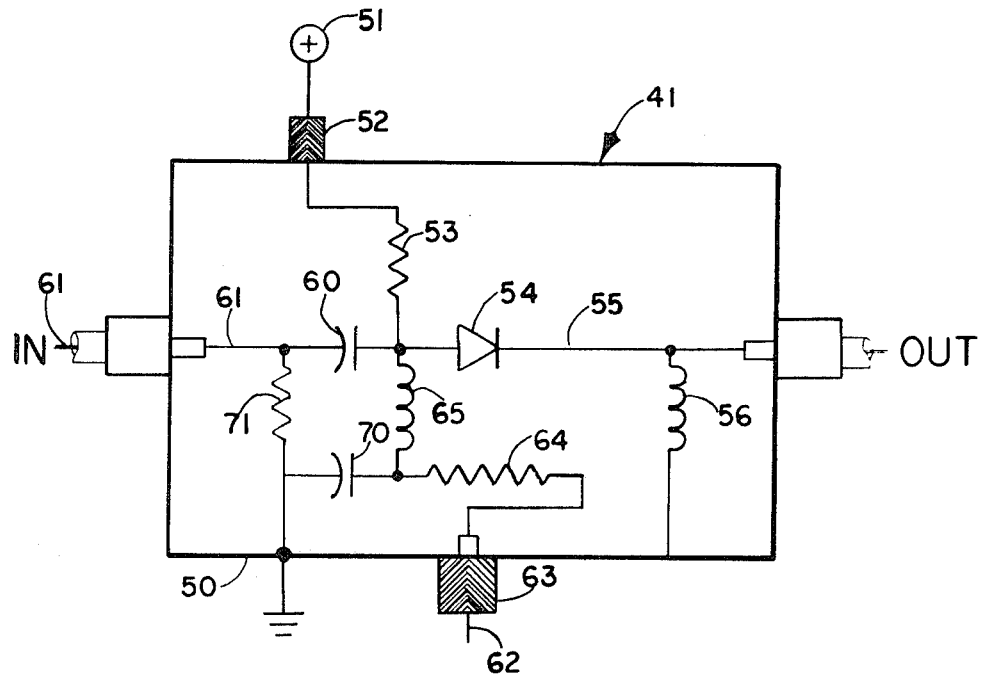
FIG. 5 is an electrical schematic of the modulator of this invention.

The system requires a modulator 41 as indicated in addition to the standard modulators of the system. FIG. 5 shows a preferred modulator 41. It employs a housing 50 which is grounded, and a positive power supply 51 connected through an insulating feedthrough 52 to a dropping resistor 53 to the anode of the diode 54. The cathode of diode 54 is connected via the principal signal conductor 55 and an RF choke 56 to the grounded case. The anode of diode 54 is connected via isolation capacitor 60 to the RF or carrier input terminal 61 to which the 110 mHz carrier is applied. The modulation signal is supplied through lead 62, insulating connector 63, resistor 64, and RF choke 65 to the anode of diode 54, where mixing takes place. An additional coupling capacitor 70 and resistor 71 are connected in series between the RF input lead 61 and the modulation input circuit complete the modulator.

The foregoing description of the particularly suitable diode modulator is representative only since other forms of modulators operable in the frequency range of interest may be substituted.

A simplified circuit demonstrating this invention and designed to use the same carrier frequency generator may be used as a corrected ILS system with the correction signal phase locked to either of the primary modulation signal sources. This arrangement is shown in FIG. 6 in which the same elements of the system of FIG. 4 are given identical reference numerals for clarity sake, including the carrier frequency generator 30, modulation signal generators 31 and 32, the principal modulators 33 and 34, and the error correcting modulator 41, as well as antennas 36, 40 and 43. In this case, no separate correction signal generator is used. Instead, the correction signal modulator is connected via lead 80 and switch 81 which selectively connects the modulator 41 to either reverse polarity lead 82 from the 150 Hz generator or reverse polarity lead 83 from the 96 Hz generator 32. Signals from the modulation frequency generator 31 are applied through a transformer 84 with a grounded center tapped secondary winding 85. One side of the secondary winding is taken through lead 86 and capacitor 87 to the 150 Hz modulator 33 and then supplied to the antenna 36. The same signal in opposite phase is extracted from the transformer 84 via lead 90 and potentiometer 91 and capacitor 92 to the lead 82. By this simple arrangement, the modulation frequency applied to modulator 41 is equal in frequency and 180° out of phase with the signal applied to modulator 33. Again, the antenna 43 is positioned in the line of sight between the antenna 36 and the interferring structure to provide interference cancellation.

It is apparent that the circuits connecting the modulation frequency generator 32 with its modulator 34 and the lead 83 are identical with that associated with the generator 31 and for this reason are supplied with synchronized opposite polarity described in further detail. Suffice it to say that the signal for modulator 34 is extracted from one side of the secondary transformer 100. The identical opposite in phase is extracted from the same secondary and applied through potentiometer 101 and capacitor 102 to lead 83. It is therefore clear that the modulator 41 may be supplied with synchronized opposite polarity modulation signals associated with either the primary modulation frequencies of the system. In the case shown with switch 81 connected to lead 83, the suppression antenna of course is located in line of sight between the antenna 40 and the interfering structure.

The carrier frequency of the system is applied to all three modulators via lead 35 and a four-way coupler 110 with two ports connected via leads 35A and 35B to modulators 34 and 33, respectively, and lead 44 and an attenuator 111 to the suppression signal modulator 41. The remaining port of the coupler 110 is connected to a matching termination 112. In this manner, all three modulators are provided with a carrier signal and the output of antenna 43 is assured of producing the same carrier frequency as the primary radiation of the ILS system as well as one or the other of the modulation frequencies as required for correction. It should be apparent that the system is not limited to a single error correcting antenna 43. In extreme circumstances where interfering structures are present in the fields of both primary antennas, a number of compensating antennas 43 may be required and more than one modulator, each connected respectively to the modulation generators 31 and 32.

If one particular area is subject to frequent interference from moving reflectors such as taxiing aircraft, it is apparent that a particular directional antenna 43 may be constantly beamed at the area whereby its effect is negligible in the absence of some reflector in its field. In such case, it is possible to provide in the order of 20 db correction of the interfering reflected signal.

In addition to the foregoing circuit detail, the successful operation of the system involves proper alignment and placement of the interference cancelling antenna. Placement as indicated before on the line of sight between the ILS antenna and the interfering structure causes the reflected cancellation signal to be similar to that of the reflected ILS signal.

The correction of the ILS beam distortion by the correction system is independent of carrier phase congruence. False indications are either not introduced elsewhere or can be corrected by additional antennas on or behind the offending structure if necessary. In general, the error caused by a large structure can usually be corrected by single fixed correction ratio command setting of the attenuator 111 of FIG. 6, and modulation attenuator potentiometers 91 and 101. Because of the many variables of conditions, a degree of alignment adjustment of the antennas and power adjustment of the correction system, of course, is necessary for optimum operation. The correction ratio command settings can also be automatically adjusted by monitors when required.

THEORETICAL ANALYSIS OF SYSTEM OPERATION

The problem of ILS error due to a building-scattered signal is described above and the solution proposed. Considering the problem analytically, it is well known that, for the localizer in the absence of any interfering structure, the difference of the modulating signal amplitudes for the angular frequency $\omega_1$ and $\omega_2$ may be used to determine the position of the aircraft in the azimuthal plane. If $m_1$ and $m_2$ denote respectively the amplitudes of the modulating signals of frequencies $\omega_1$ and $\omega_2$, the input signal at the ILS receiver in an aircraft located at an arbitrary position in the azimuthal plane and in the absence of the building, can be expressed as $$e_1 = [A_1 + m_1 \cos \omega_1 t] \sin(\omega_c t + \psi_1) + [A_2 - m_2 \cos \omega_2 t] \sin(\omega_c t + \psi_2) \quad (1)$$

where $\omega_c$ denotes the angular frequency of the ILS carrier and $A_1$, $A_2$, $\psi_1$ and $\psi_2$ can assume arbitrary values depending on the ILS transmitter power, antenna characteristics and the distance between the ILS transmitter and the point of observation. The building-scattered signal under similar circumstances constitutes an additional input to the ILS receiver. This input can be expressed as $$e_B = R_1[A_1 + m_1 \cos \omega_1 t] \sin(\omega_c t + \psi_3) + R_2[A_2 - m_2 \cos \omega_2 T] \sin(\omega_c t + \psi_4) \quad (2)$$

where $R_1$ and $R_2$ are effective reflection coefficients for the signals with modulation frequencies $\psi_1$ and $\psi_2$ respectively. In "real life" situations $R_1$ and $R_2$ will include the characteristics of the antenna radiation lobes illuminating the building as well as the scattering pattern of the building for the ILS signals. It is evident from equation (2) that any signal which can cancel $e_B$ at all positions in space must be phase congruent with the building-scattered signal to maintain an identical phase relation, as indicated by $\psi_3$ and $\psi_4$, for all regions in space. As stated earlier, this may not be physically realizable in many cases.

In accordance with the invention, the cancelling signal has the form $$e_c = [A_3 + Km_1 \cos \omega_1 t] \sin(\omega_c t + \psi_5) \quad (3)$$

where $A_3$ and $K$ can be controlled such that the post-detection intelligence of the combined signal $e_B + e_c$ approaches zero. The criterion for this cancellation can be represented by the equation $$(R_1 A_1 + A_3 K)m_1 - R_2 A_2 m_2 = 0 \quad (4)$$

For any fixed location of the interfering building and the ILS transmitter, $R_1 A_1$, $m_1$, $m_2$ and $R_2 A_2$ will be constant although the values of $R_1 A_1$ and $R_2 A_2$ may not be determined easily. The form of this equation (4) may be slightly modified depending on the characteristics of the ILS receiver. In any event, it can always be represented in the form of one algebraic equation with one unknown. However, equation (4) will always have a unique solution for any specific case under consideration. Our invention provides an arrangement by which $A_3$ or $K$, or both, can be controlled to satisfy equation (4).

In addition to satisfying equation (4), indeed other constraints must be imposed on the system such that the cancellation takes place in the entire region of consequence for the building-scattered signal and no error is introduced by the correcting system itself. The first objective is obtained by exciting the building or scattering structure with the cancelling signal in the same way as the signal from the ILS beams. Thus, the scattered field pattern for the ILS and cancelling signals will very nearly be the same. In order to meet the second objective, it is necessary to locate the cancelling antenna so that the field radiated from the cancelling antenna in the diffraction zone of the building becomes negligible. In practice, both of these objectives are physically realizable by placing the cancelling signal antenna along the path joining the ILS transmitter and the building. In practice, some adjustments are necessary to obtain an optimum result.

Degradation of the ILS facility performance can be avoided by limiting the amount of suppression supplied by the system antennas so that it is just sufficient to drive the original interference signal to or through zero. The objective of the system is simply to reduce the strength of the dominant ILS modulation frequency signal being reflected by the structure so that the plane defined by the points where the 90 and 150 Hz modulation frequency signal strengths are the same is restored to the desired flat plane. The change effected by the signal from the system antenna along its line of sight to and beyond the offending structure is limited by the maximum available command ratio setting so that it will not be strong enough to cause an ILS indicator behind the structure to come out of its normal hard-over position. In the event that an unanticipated requirement necessitates the use of a suppression signal whose effectivity is greater than the clearance signal, a supplementary antenna can be placed upon the roof of the offending structure to augment the existing clearance signal in that volume of space behind the offending structure which is affected by the suppression antenna.

The system concept is also applicable to the problem of moving interference structures or sources such as taxiing aircraft. Implementation is more involved for such cases because of the relatively large volume or area over which the taxiing aircraft could be reflecting interference lobes of pre-dominantly 90 or 150 Hz sizeband signals. The system antennas and the output ratio of the reverse polarity suppression signal is able to desensitize a particular area by at least 20 db.

The foregoing description is directed toward the cancellation of errors in the runway localizer antenna pattern. However, the same system may be applied to the glide path localizer antenna system instead or to both systems where required to meet optimum ILS requirements.

The above described embodiments of this invention are merely descriptive of its principles and are not to be considered limiting. The scope of this invention instead shall be determined from the scope of the following claims including their equivalents.

We claim:

1. A system for correcting spacial errors in the antenna pattern of an instrument landing system including transmitting means producing a pair of modulated signals on a common carrier frequency with a null line along a predetermined plane of position subject to deviations due to reflections from structures in the antenna field of the system comprising,
   a source of said carrier frequency,
   means for producing a correction signal equal in frequency and opposite in phase from one of the said modulation signals,
   means modulating said carrier frequency with said correction signal, and
   antenna means for illuminating structures in the said antenna field with the correction signal modulated carrier from approximately the same direction as the said instrument landing system.

2. The combination in accordance with claim 1 wherein said antenna means is positioned along the line of sight between said instrument landing system transmitting means and a discrete interfering structure.

3. The combination in accordance with claim 1 wherein said source of carrier frequency comprises the instrument landing system carrier frequency source.

4. The combination in accordance with claim 1 wherein said means for producing a correction signal includes a phase inverter connected to a source of modulation frequency of said instrument landing system.

5. A system for producing a predetermined pattern of directional radio transmissions in the presence of radio frequency energy reflecting structures comprising,
   a source of carrier frequency energy,
   a source of at least one modulating frequency signal,
   and an antenna for radiating the signal modulated carrier into a predetermined field susceptible to reflection from interfering structures,
   a source of interference correction signal including a carrier frequency synchronous with the said carrier frequency energy and a cancellation signal equal in modulation frequency and opposite in phase from the said modulating frequency signal, and
   means for radiating said interference cancelling signal into said predetermined field in the direction of interfering structures therein.

6. The combination in accordance with claim 5 wherein said interference cancelling signal radiating means is positioned to radiate said signal at interfering structures from the same direction as the signal modulated carrier radiating antenna.

7. The combination in accordance with claim 5 wherein said source of interference cancelling signal comprises said carrier frequency energy source and a phase inverter connected to said modulating frequency signal source.

8. A system in accordance with claim 5 for producing a radio frequency correction radiation in a predetermined direction with a common carrier with two sources of modulation frequency signals,
   said interference correction signal source comprising, a modulator,
   means connecting said modulator to said source of carrier frequency energy,
   a pair of phase inverters coupled to respective sources of modulation frequency signals,
   switch means for selectively connecting either of said phase inverters to said modulator, and
   a directional antenna coupled to said modulator,
   said antenna being directed toward reflecting structure in the selected field of radiation of the system.

9. In an aircraft instrument landing system designed to radiate, in a pre-determined direction, a carrier frequency with different modulation on each side of a selected plane of position and including carrier signal generator, a first and second modulation signal generators, first and second modulator for each the first and second modulation signal generators and first and second antenna means connected to the said modulators which system is subject to interference in the plane position due to reflections from illuminated structures from said second antenna, the improvement comprising:
   a modulation frequency generator producing the same frequency as the second of said modulation signal generators,
   a third modulator for said third modulation signal generator,
   means connecting said third modulator to the source of carrier frequency energy,
   means for synchronizing third modulation frequency generator at 180° out of phase with said second modulation signal generator, and
   third antenna means coupled to said third modulator,
   third means applying the third modulation signal to said third modulator,
   said third antenna being positioned on the line of sight between said second antenna and the illuminated structure and illuminating the interfering structure whereby reflection of radiation from said second and third antennas tend to correspond and whereby any receiver in the field of the said second antenna beyond the interfering structure tends to receive simultaneous radiation from both said second and third antennas and wherein the modulation energy radiated by said second and third antennas tend to cancel.

10. The combination in accordance with claim 9 wherein said synchronizing means comprise a phase inverter connected between said second source of modulation frequency energy and said third modulator.

11. The combination in accordance with claim 9 including means for attenuating modulation energy from said phase inverter to said third modulator.

* * * * *